(12) United States Patent
Subramanya et al.

(10) Patent No.: US 12,407,580 B2
(45) Date of Patent: Sep. 2, 2025

(54) APPARATUS, METHOD AND COMPUTER PROGRAM

(71) Applicant: Nokia Technologies Oy, Espoo (FI)

(72) Inventors: Tejas Subramanya, Munich (DE); Sina Khatibi, Munich (DE); Fabio Giust, Munich (DE)

(73) Assignee: Nokia Technologies Oy, Espoo (FI)

( * ) Notice: Subject to any disclaimer, the term of this patent is extended or adjusted under 35 U.S.C. 154(b) by 40 days.

(21) Appl. No.: 18/432,149

(22) Filed: Feb. 5, 2024

(65) Prior Publication Data

US 2024/0275690 A1 Aug. 15, 2024

(30) Foreign Application Priority Data

Feb. 10, 2023 (GB) ..................................... 2301951

(51) Int. Cl.
*G06F 15/16* (2006.01)
*G06N 20/00* (2019.01)
*H04L 41/16* (2022.01)

(52) U.S. Cl.
CPC ............. *H04L 41/16* (2013.01); *G06N 20/00* (2019.01)

(58) Field of Classification Search
CPC ................................. H04L 41/16; G06N 20/00
USPC ........................................................ 709/223
See application file for complete search history.

(56) References Cited

U.S. PATENT DOCUMENTS

| | | | | |
|---|---|---|---|---|
| 11,036,572 B2 * | 6/2021 | Liu | ..................... | G06F 11/0751 |
| 11,227,014 B2 * | 1/2022 | Leskovec | .............. | G06F 18/211 |
| 11,341,404 B2 * | 5/2022 | Noda | ..................... | G06N 3/084 |
| 11,922,308 B2 * | 3/2024 | Leskovec | ................ | G06F 16/51 |
| 12,002,195 B2 * | 6/2024 | Xie | .......................... | G06T 3/40 |
| 12,125,065 B2 * | 10/2024 | Wright | ..................... | G06Q 30/0261 |
| 12,154,204 B2 * | 11/2024 | Zhao | ..................... | G10L 15/02 |
| 12,230,020 B2 * | 2/2025 | Olaleye | ................ | G06N 3/086 |
| 2018/0268293 A1 * | 9/2018 | Noda | ..................... | G06N 3/043 |
| 2019/0286943 A1 * | 9/2019 | Leskovec | ................ | G06F 18/29 |
| 2020/0133758 A1 * | 4/2020 | Liu | ....................... | G06F 3/0689 |
| 2020/0401930 A1 * | 12/2020 | Smirnov | ................ | G06N 20/00 |
| 2022/0156574 A1 * | 5/2022 | Anwar | ................... | G06N 20/00 |
| 2023/0130287 A1 * | 4/2023 | Zhao | ..................... | G06T 13/40 |
| | | | | 345/474 |

(Continued)

OTHER PUBLICATIONS

"3rd Generation Partnership Project; Technical Specification Group Services and System Aspects; Architecture enhancements for 5G System (5GS) to support network data analytics services (Release 18)", 3GPP TS 23.288, V18.0.0, Dec. 2022, pp. 1-220.

(Continued)

*Primary Examiner* — Moustafa M Meky
(74) *Attorney, Agent, or Firm* — Nokia Technologies Oy

(57) ABSTRACT

There is provided an apparatus means for, at a central node associated with a plurality of distributed nodes, determining that at least one distributed node of the plurality of distributed nodes has not provided training information relating to a training process of a machine learning model before expiry of a first timer for a given iteration of N iterations of the training process, means for generating analytic information relative to the at least one distributed node, wherein the analytic information comprises a count based on the determining and means for providing the analytic information to a storage function.

20 Claims, 9 Drawing Sheets

(56) References Cited

U.S. PATENT DOCUMENTS

| | | | |
|---|---|---|---|
| 2023/0153975 A1* | 5/2023 | Lutich | G06T 7/0004 |
| | | | 382/141 |
| 2023/0237787 A1* | 7/2023 | Olaleye | G06N 3/08 |
| | | | 382/157 |
| 2023/0252324 A1* | 8/2023 | Matlick | H04L 61/5007 |
| | | | 706/12 |
| 2023/0351245 A1 | 11/2023 | Subramanya et al. | |
| 2023/0376754 A1* | 11/2023 | Baida | G06N 3/084 |
| 2023/0376835 A1* | 11/2023 | Malkiel | G06N 3/0895 |
| 2024/0152754 A1* | 5/2024 | Leskovec | G06N 20/00 |
| 2024/0244395 A1* | 7/2024 | Robstad | G06N 20/00 |
| 2024/0265295 A1* | 8/2024 | Zhong | G06N 20/00 |
| 2024/0395625 A1* | 11/2024 | Li | H10D 84/038 |

OTHER PUBLICATIONS

"3rd Generation Partnership Project; Technical Specification Group Services and System Aspects; Procedures for the 5G System (5GS); Stage 2 (Release 18)", 3GPP TS 23.502, V18.0.0, Dec. 2022, pp. 1-773.

"Service operations update to general procedure for Federated Learning between NWDAFs", 3GPP TSG-SA2 Meeting # 156E (e-meeting), S2-2306098, Intel, Apr. 17-21, 2023, 5 pages.

* cited by examiner

APPARATUS, METHOD AND COMPUTER PROGRAM

FIELD

The present application relates to a method, apparatus, system and computer program and in particular but not exclusively to federated learning (FL) training analytics.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communication sessions may comprise, for example, communication of data for carrying communications such as voice, video, electronic mail (email), text message, multimedia and/or content data and so on. Non-limiting examples of services provided comprise two-way or multi-way calls, data communication or multimedia services and access to a data network system, such as the Internet.

In a wireless communication system at least a part of a communication session between at least two stations occurs over a wireless link. Examples of wireless systems comprise public land mobile networks (PLMN), satellite based communication systems and different wireless local networks, for example wireless local area networks (WLAN). Some wireless systems can be divided into cells, and are therefore often referred to as cellular systems.

A user can access the communication system by means of an appropriate communication device or terminal. A communication device of a user may be referred to as user equipment (UE) or user device. A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is Universal Mobile Telecommunications System (UMTS) Terrestrial Radio Access Network (UTRAN) (3G radio). Other examples of communication systems are the long-term evolution (LTE) of the Universal Mobile Telecommunications System (UMTS) radio-access technology and so-called 5G or New Radio (NR) networks. NR is being standardized by the 3rd Generation Partnership Project (3GPP).

SUMMARY

In a first aspect there is provided an apparatus comprising means for, at a central node associated with a plurality of distributed nodes, determining that at least one distributed node of the plurality of distributed nodes has not provided training information relating to a training process of a machine learning model before expiry of a first timer for a given iteration of N iterations of the training process, means for generating analytic information relative to the at least one distributed node, wherein the analytic information comprises a count based on the determining and means for providing the analytic information to a storage function.

The apparatus may comprise means for requesting the at least one distributed node to indicate an expected time to provide training information.

The apparatus may comprise means for receiving an expected time to provide training information from the at least one distributed node in response to the request.

The apparatus may comprise means for determining whether the expected time is less than a second timer and, if so, means for receiving the information relating to training of the machine learning model before expiry of the second timer and, if not, means for providing an indication to the at least one distributed node to not provide the information for the given iteration.

The apparatus may comprise means for determining a confidence value for the at least one distributed node based on the analytic information and providing the confidence value to the storage function.

The central node may comprise a root federated learning aggregator. The plurality of distributed nodes may comprise a plurality of federated learning distributed nodes.

The central node may comprise a root federated learning aggregator. The plurality of distributed nodes may comprise a plurality of lower-level federated learning aggregators.

The analytic information may further comprise at least one of the following: average training information response time for the at least one distributed node over N iterations, the average delay for providing the training information for the at least distributed node over N iterations, a relative degree of delay for providing the training information for the at least distributed node over N iterations, the number of iterations performed by the at least one distributed node during the training process, the number of times the at least one distributed node left and joined the plurality of distributed nodes during the training process, the number of the plurality of distributed nodes which participated in at least one of the N iterations of the training process, the number of the plurality of distributed nodes which have participated in each N iteration of the training process or the number of distributed nodes which have joined and left the plurality of distributed nodes during the training process.

The storage function may be an analytics data repository function, network repository function or operations, administration and management entity.

The central node may comprise at least one of the following: radio access network, RAN, operations, administration and management entity, core network operations, administration and management entity, network function for performing data analytics, user equipment, base station, non-real time RAN intelligence controller, RIC, or near real time RIC. The plurality of distributed nodes may comprise at least one of the following: RAN operations, administration and management entity, core network operations, administration and management entity, network function for performing data analytics, user equipment, base station, non-real time RIC or near real time RIC.

In a second aspect there is provided an apparatus comprising means for receiving, at a distributed node, a training configuration and a first timer for a given iteration of N iterations of a training process of a machine learning model from a central node, means for generating training information relating to the training process and means for providing the training information to the central node for use in determining analytic information relative to the at least one distributed node.

The apparatus may comprise means for receiving, from the central node, a request to indicate an expected time to provide the training information, if said training information is not provided to the central node before expiration of the first timer and means for providing to the central node said expected time to provide training information in response to the request.

The apparatus may comprise means for receiving a second timer or an indication to not provide the information for the given iteration.

The distributed node may comprise at least one of the following: RAN operations, administration and management entity, core network operations, administration and management entity, network function for performing data analytics, user equipment, base station, non-real time RIC or near real time RIC.

The central node may comprise at least one of the following: radio access network, RAN, operations, administration and management entity, core network operations, administration and management entity, network function for performing data analytics, user equipment, base station, non-real time RAN intelligence controller, RIC, or near real time RIC.

In a third aspect there is provided a method comprising, at a central node associated with a plurality of distributed nodes, determining that at least one distributed node of the plurality of distributed nodes has not provided training information relating to a training process of a machine learning model before expiry of a first timer for a given iteration of N iterations of the training process, generating analytic information relative to the at least one distributed node, wherein the analytic information comprises a count based on the determining and providing the analytic information to a storage function.

The method may comprise requesting the at least one distributed node to indicate an expected time to provide training information.

The method may comprise receiving an expected time to provide training information from the at least one distributed node in response to the request.

The method may comprise determining whether the expected time is less than a second timer and, if so, receiving the information relating to training of the machine learning model before expiry of the second timer and, if not, providing an indication to the at least one distributed node to not provide the information for the given iteration.

The method may comprise determining a confidence value for the at least one distributed node based on the analytic information and providing the confidence value to the storage function.

The central node may comprise a root federated learning aggregator. The plurality of distributed nodes may comprise a plurality of federated learning distributed nodes.

The central node may comprise a root federated learning aggregator. The plurality of distributed nodes may comprise a plurality of lower-level federated learning aggregators.

The analytic information may further comprise at least one of the following: average training information response time for the at least one distributed node over N iterations, the average delay for providing the training information for the at least distributed node over N iterations, a relative degree of delay for providing the training information for the at least distributed node over N iterations, the number of iterations performed by the at least one distributed node during the training process, the number of times the at least one distributed node left and joined the plurality of distributed nodes during the training process, the number of the plurality of distributed nodes which participated in at least one of the N iterations of the training process, the number of the plurality of distributed nodes which have participated in each N iteration of the training process or the number of distributed nodes which have joined and left the plurality of distributed nodes during the training process.

The storage function may be an analytics data repository function, network repository function or operations, administration and management entity.

The central node may comprise at least one of the following: radio access network, RAN, operations, administration and management entity, core network operations, administration and management entity, network function for performing data analytics, user equipment, base station, non-real time RAN intelligence controller, RIC, or near real time RIC. The plurality of distributed nodes may comprise at least one of the following: RAN operations, administration and management entity, core network operations, administration and management entity, network function for performing data analytics, user equipment, base station, non-real time RIC or near real time RIC.

In a fourth aspect there is provided a method comprising receiving, at a distributed node, a training configuration and a first timer for a given iteration of N iterations of a training process of a machine learning model from a central node, generating training information relating to the training process and providing the training information to the central node for use in determining analytic information relative to the at least one distributed node.

The method may comprise receiving, from the central node, a request to indicate an expected time to provide the training information, if said training information is not provided to the central node before expiration of the first timer and providing to the central node said expected time to provide training information in response to the request.

The apparatus may comprise receiving a second timer or an indication to not provide the information for the given iteration.

The distributed node may comprise at least one of the following: RAN operations, administration and management entity, core network operations, administration and management entity, network function for performing data analytics, user equipment, base station, non-real time RIC or near real time RIC.

The central node may comprise at least one of the following: radio access network, RAN, operations, administration and management entity, core network operations, administration and management entity, network function for performing data analytics, user equipment, base station, non-real time RAN intelligence controller, RIC, or near real time RIC.

In a fifth aspect there is provided an apparatus comprising at least one processor and at least one memory storing instructions that, when executed by the at least one processor, cause the apparatus at least to, at a central node associated with a plurality of distributed nodes, determine that at least one distributed node of the plurality of distributed nodes has not provided training information relating to a training process of a machine learning model before expiry of a first timer for a given iteration of N iterations of the training process, generate analytic information relative to the at least one distributed node, wherein the analytic information comprises a count based on the determining and provide the analytic information to a storage function.

The apparatus may be caused to request the at least one distributed node to indicate an expected time to provide training information.

The apparatus may be caused to receive an expected time to provide training information from the at least one distributed node in response to the request.

The apparatus may be caused to determine whether the expected time is less than a second timer and, if so, receive the information relating to training of the machine learning model before expiry of the second timer and, if not, provide an indication to the at least one distributed node to not provide the information for the given iteration.

The apparatus may be caused to determine a confidence value for the at least one distributed node based on the analytic information and provide the confidence value to the storage function.

The central node may comprise a root federated learning aggregator. The plurality of distributed nodes may comprise a plurality of federated learning distributed nodes.

The central node may comprise a root federated learning aggregator. The plurality of distributed nodes may comprise a plurality of lower-level federated learning aggregators.

The analytic information may further comprise at least one of the following: average training information response time for the at least one distributed node over N iterations, the average delay for providing the training information for the at least distributed node over N iterations, a relative degree of delay for providing the training information for the at least distributed node over N iterations, the number of iterations performed by the at least one distributed node during the training process, the number of times the at least one distributed node left and joined the plurality of distributed nodes during the training process, the number of the plurality of distributed nodes which participated in at least one of the N iterations of the training process, the number of the plurality of distributed nodes which have participated in each N iteration of the training process or the number of distributed nodes which have joined and left the plurality of distributed nodes during the training process.

The storage function may be an analytics data repository function, network repository function or operations, administration and management entity.

The central node may comprise at least one of the following: radio access network, RAN, operations, administration and management entity, core network operations, administration and management entity, network function for performing data analytics, user equipment, base station, non-real time RAN intelligence controller, RIC, or near real time RIC. The plurality of distributed nodes may comprise at least one of the following: RAN operations, administration and management entity, core network operations, administration and management entity, network function for performing data analytics, user equipment, base station, non-real time RIC or near real time RIC.

In a sixth aspect there is provided an apparatus comprising at least one processor and at least one memory storing instructions that, when executed by the at least one processor, cause the apparatus at least to, receive, at a distributed node, a training configuration and a first timer for a given iteration of N iterations of a training process of a machine learning model from a central node, generate training information relating to the training process and provide the training information to the central node for use in determining analytic information relative to the distributed node.

The apparatus may be caused to receive, from the central node, a request to indicate an expected time to provide the training information, if said training information is not provided to the central node before expiration of the first timer and provide to the central node said expected time to provide training information in response to the request.

The apparatus may be caused to receive a second timer or an indication to not provide the information for the given iteration.

The distributed node may comprise at least one of the following: RAN operations, administration and management entity, core network operations, administration and management entity, network function for performing data analytics, user equipment, base station, non-real time RIC or near real time RIC.

The central node may comprise at least one of the following: radio access network, RAN, operations, administration and management entity, core network operations, administration and management entity, network function for performing data analytics, user equipment, base station, non-real time RAN intelligence controller, RIC, or near real time RIC.

In a seventh aspect there is provided a computer readable medium comprising instructions which, when executed by an apparatus for a network node, cause the apparatus to perform at least the following, at a central node associated with a plurality of distributed nodes: determining that at least one distributed node of the plurality of distributed nodes has not provided training information relating to a training process of a machine learning model before expiry of a first timer for a given iteration of N iterations of the training process, generating analytic information relative to the at least one distributed node, wherein the analytic information comprises a count based on the determining and providing the analytic information to a storage function.

The apparatus may be caused to perform requesting the at least one distributed node to indicate an expected time to provide training information.

The apparatus may be caused to perform receiving an expected time to provide training information from the at least one distributed node in response to the request.

The apparatus may be caused to perform determining whether the expected time is less than a second timer and, if so, receiving the information relating to training of the machine learning model before expiry of the second timer and, if not, providing an indication to the at least one distributed node to not provide the information for the given iteration.

The apparatus may be caused to perform determining a confidence value for the at least one distributed node based on the analytic information and providing the confidence value to the storage function.

The central node may comprise a root federated learning aggregator. The plurality of distributed nodes may comprise a plurality of federated learning distributed nodes.

The central node may comprise a root federated learning aggregator. The plurality of distributed nodes may comprise a plurality of lower-level federated learning aggregators.

The analytic information may further comprise at least one of the following: average training information response time for the at least one distributed node over N iterations, the average delay for providing the training information for the at least distributed node over N iterations, a relative degree of delay for providing the training information for the at least distributed node over N iterations, the number of iterations performed by the at least one distributed node during the training process, the number of times the at least one distributed node left and joined the plurality of distributed nodes during the training process, the number of the plurality of distributed nodes which participated in at least one of the N iterations of the training process, the number of the plurality of distributed nodes which have participated in each N iteration of the training process or the number of distributed nodes which have joined and left the plurality of distributed nodes during the training process.

The storage function may be an analytics data repository function, network repository function or operations, administration and management entity.

The central node may comprise at least one of the following: radio access network, RAN, operations, administration and management entity, core network operations, administration and management entity, network function for performing data analytics, user equipment, base station, non-real time RAN intelligence controller, RIC, or near real time RIC. The plurality of distributed nodes may comprise at least one of the following: RAN operations, administration and management entity, core network operations, administration and management entity, network function for performing data analytics, user equipment, base station, non-real time RIC or near real time RIC.

In an eighth aspect there is provided a computer readable medium comprising instructions which, when executed by an apparatus for a network node, cause the apparatus to perform at least the following receiving, at a distributed node, a training configuration and a first timer for a given iteration of N iterations of a training process of a machine learning model from a central node, generating training information relating to the training process and providing the training information to the central node for use in determining analytic information relative to the at least one distributed node.

The apparatus may be caused to perform receiving, from the central node, a request to indicate an expected time to provide the training information, if said training information is not provided to the central node before expiration of the first timer and providing to the central node said expected time to provide training information in response to the request.

The apparatus may be caused to perform receiving a second timer or an indication to not provide the information for the given iteration.

The distributed node may comprise at least one of the following: RAN operations, administration and management entity, core network operations, administration and management entity, network function for performing data analytics, user equipment, base station, non-real time RIC or near real time RIC.

The central node may comprise at least one of the following: radio access network, RAN, operations, administration and management entity, core network operations, administration and management entity, network function for performing data analytics, user equipment, base station, non-real time RAN intelligence controller, RIC, or near real time RIC.

In a ninth aspect there is provided a non-transitory computer readable medium comprising program instructions for causing an apparatus to perform at least the method according to the third or fourth aspect.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which.

DETAILED DESCRIPTION

Before explaining in detail the examples, certain general principles of a wireless communication system and mobile communication devices are briefly explained with reference to FIG. 1, FIG. 2 and FIG. 3 to assist in understanding the technology underlying the described examples.

An example of a suitable communications system is the 5G or NR concept. Network architecture in NR may be similar to that of LTE-advanced. Base stations of NR systems may be known as next generation NodeBs (gNBs). Changes to the network architecture may depend on the need to support various radio technologies and finer Quality of Service (QOS) support, and some on-demand requirements for e.g. QoS levels to support Quality of Experience (QoE) for a user. Also network aware services and applications, and service and application aware networks may bring changes to the architecture. Those are related to Information Centric Network (ICN) and User-Centric Content Delivery Network (UC-CDN) approaches. NR may use Multiple Input-Multiple Output (MIMO) antennas, many more base stations or nodes than the LTE (a so-called small cell concept), including macro sites operating in co-operation with smaller stations and perhaps also employing a variety of radio technologies for better coverage and enhanced data rates.

Future networks may utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Figure 1:
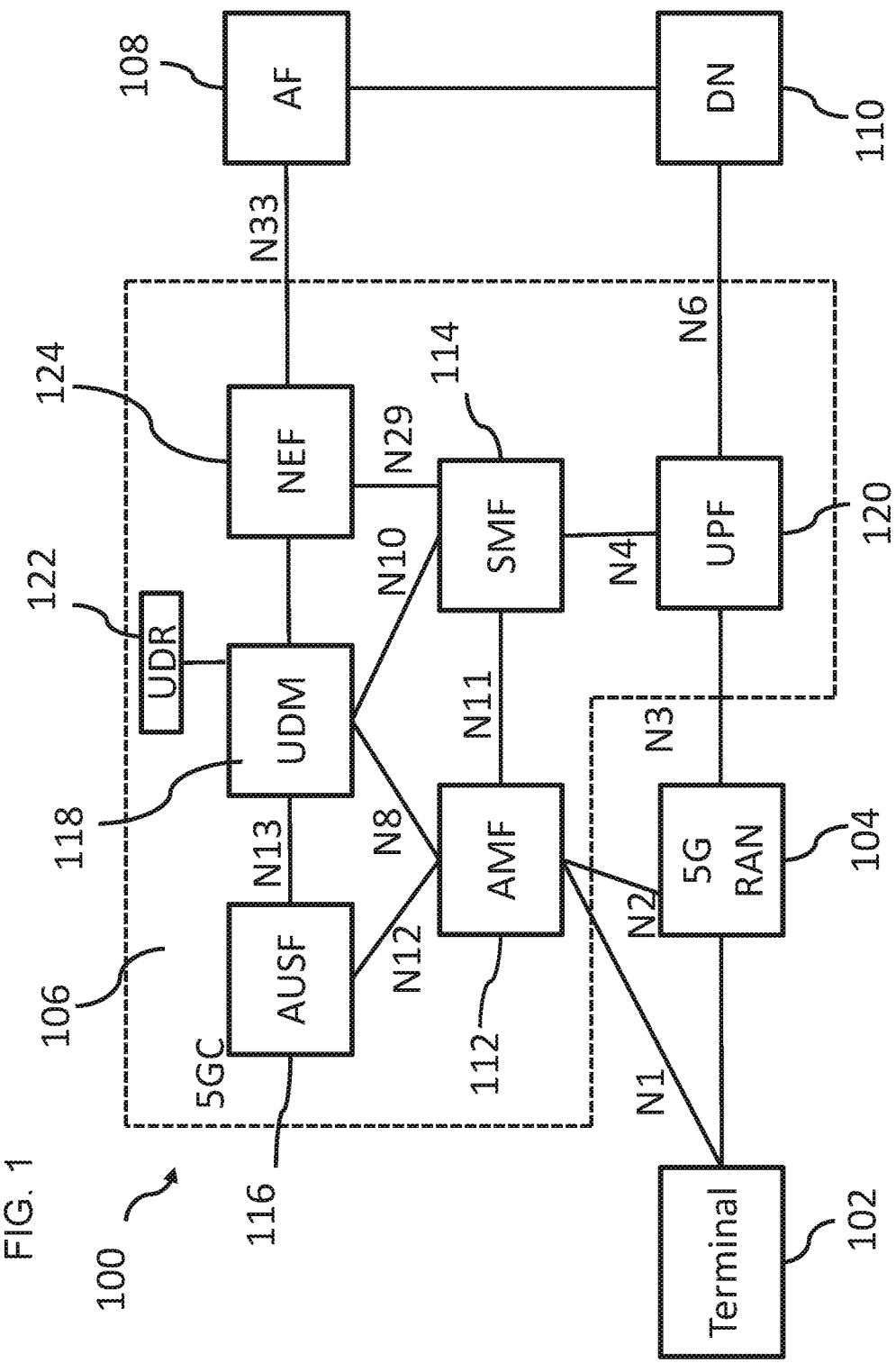
FIG. 1 shows a schematic diagram of an example 5GS communication system.

FIG. 1 shows a schematic representation of a 5G system (5GS) 100. The 5GS may comprise a user equipment (UE)

102 (which may also be referred to as a communication device or a terminal), a 5G radio access network (5GRAN) 104, a 5G core network (5GCN) 106, one or more internal or external application functions (AF) 108 and one or more data networks (DN) 110.

An example 5G core network (CN) comprises functional entities. The 5GCN 106 may comprise one or more Access and mobility Management Functions (AMF) 112, one or more session management functions (SMF) 114, an authentication server function (AUSF) 116, a Unified Data Management (UDM) 118, one or more user plane functions (UPF) 120, a Unified Data Repository (UDR) 122 and/or a Network Exposure Function (NEF) 124. The UPF is controlled by the SMF (Session Management Function) that receives policies from a PCF (Policy Control Function).

The CN is connected to a UE via the Radio Access Network (RAN). The 5GRAN may comprise one or more gNodeB (gNB) Distributed Unit(DU) functions connected to one or more gNodeB (gNB) Centralized Unit(CU) functions. The RAN may comprise one or more access nodes.

A User Plane Function (UPF) referred to as PDU Session Anchor (PSA) may be responsible for forwarding frames back and forth between the DN and the tunnels established over the 5G towards the UE(s) exchanging traffic with the DN.

Figure 2:
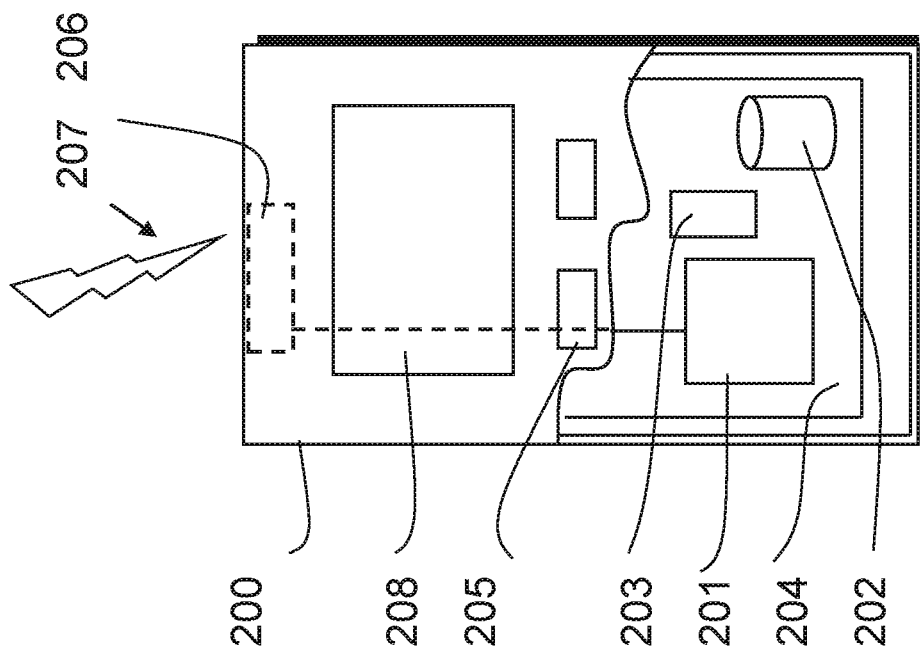
FIG. 2 shows a schematic diagram of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, voice over IP (VOIP) phones, portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), smart devices, wireless customer-premises equipment (CPE), or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts, and other information.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

Figure 3:
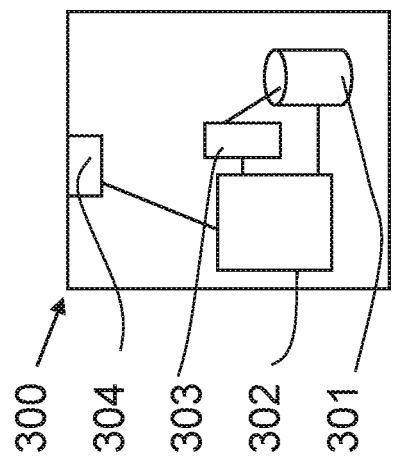
FIG. 3 shows a schematic diagram of an example control apparatus.

FIG. 3 shows an example of a control apparatus 300 for a communication system, for example to be coupled to and/or for controlling a station of an access system, such as a RAN node, e.g. a base station, eNB or gNB, a relay node or a core network node such as an MME or Serving Gateway (S-GW) or Packet Data Network Gateway (P-GW), or a core network function such as AMF/SMF, or a server or host. The method may be implemented in a single control apparatus or across more than one control apparatus. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head.

Typical Artificial Intelligence (AI) and Machine Learning (ML) approaches involve centralizing the data that are collected by distributed nodes on a central node for model training. To minimize the data exchange between the distributed nodes and the central node where the model training is usually done, Federated Learning (FL) is introduced.

Figure 4:
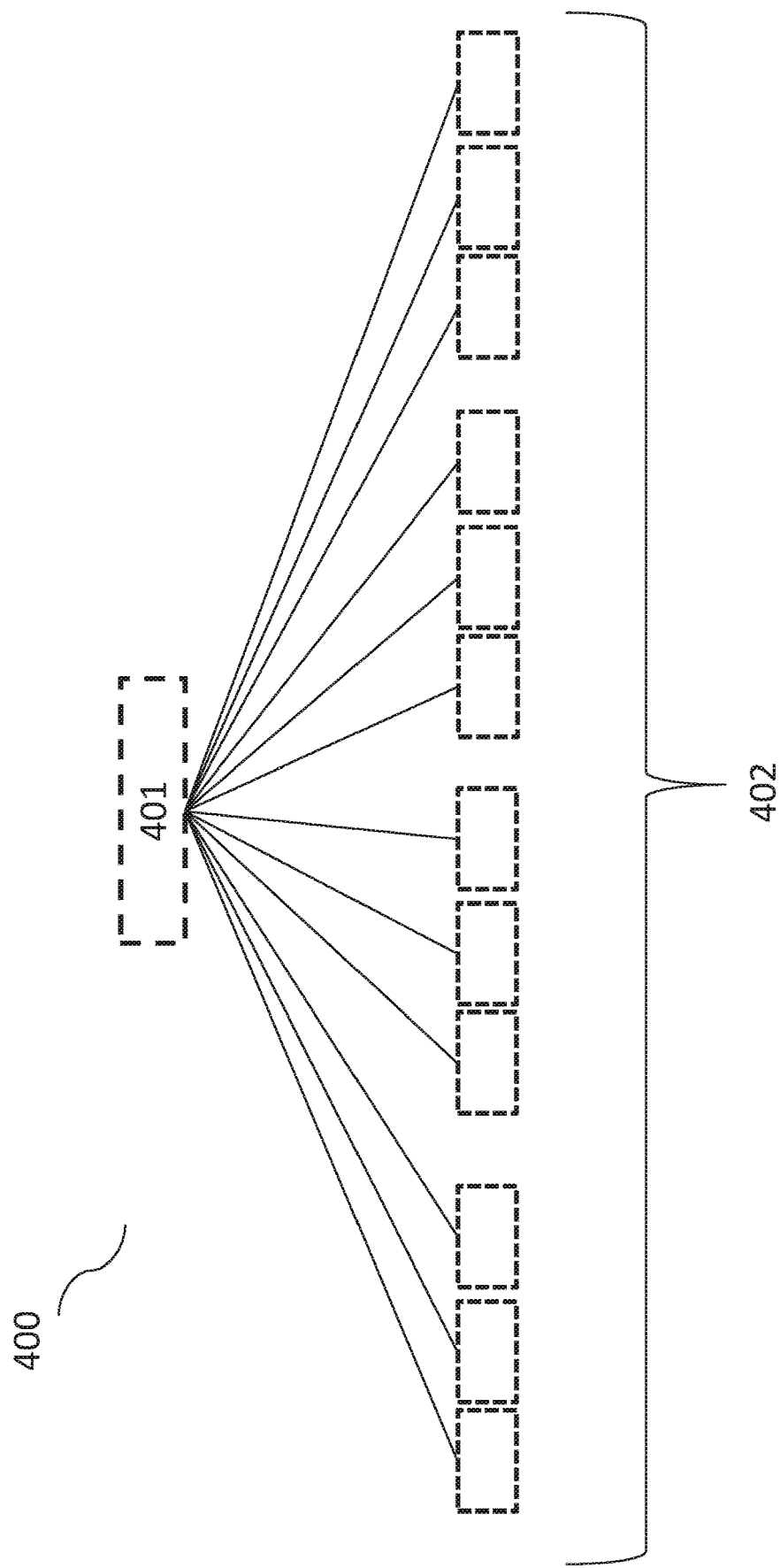
FIG. 4 shows a schematic diagram of an example Federated Learning Architecture.

FIG. 4 illustrates an example FL architecture 400 comprising a central node 401 and distributed nodes 402.

In FL, instead of training a model at the central node 401, different versions of the model are trained at different distributed nodes 402 (taking into account that each distributed node 402 has its own local data) in an iterative manner. During each iteration, the central node 401 (referred as an FL aggregator in the following) aggregates local models that are partially trained at the distributed nodes 402. Then a consolidated single global model is sent back to the distributed nodes 402. This process is repeated until the global model converges. In FL, the training process (i.e., distributed node selection, model aggregation, parameters broadcasting and model updating) is coordinated by a central FL Aggregator 401.

An iterative FL process can be summarized in four steps.

Step 1 involves distributed node selection and local training. The FL aggregator (i.e., the central node 401) selects (either randomly or based on distributed training node selection schemes) and asks K distributed nodes 402 to download a trainable model from the FL aggregator 401. All K distributed nodes 402 compute training gradients or model parameters and send locally trained model parameters to the FL aggregator 401.

Step 2 is known as model aggregating. The FL aggregator 401 performs aggregation of the uploaded model parameters from K distributed nodes 402.

Step 3 involves broadcasting parameters. The FL aggregator 401 broadcasts the aggregated model parameters to the K distributed nodes 402.

Step 4 is known as model updating. The K distributed nodes 402 update their respective local models with the received aggregated parameters and examine the performance of updated models.

After several local training and update exchanges between the FL aggregator 401 and its associated K distributed nodes 402, it is possible to achieve a global optimal learning model.

In Federated Learning (FL), for each, or several, iterations of a training process, the FL Aggregator (FLA) selects the participant FL distributed nodes (FLDNs) from candidate FLDNs based on a certain criteria (or randomly). The FLDN is an example of distributed node, while the FLA is an example of central node. The selection of the distributed node may help to ensure the success of the FL and make the FL more resilient to, e.g., errors, faults, unforeseen latency, and even malicious attacks. Currently, the selection criteria is based on factors such as computational resource availability in FLDNs, power availability in FLDNs, link quality to FLDNs, abnormal behaviour of FLDNs (as determined by NWDAF which is specified in 3GPP standards), quality/trustworthiness of local training data in FLDNs, etc., which directly impacts the trained global model performance.

Figure 5A:
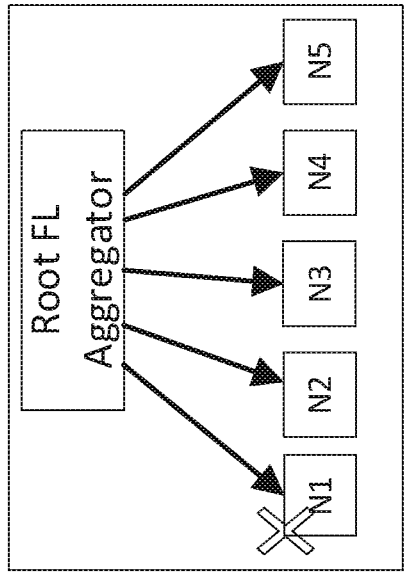
FIG. 5a shows a schematic diagram of an example FL architecture with a delayed FLDN.
Figure 5B:
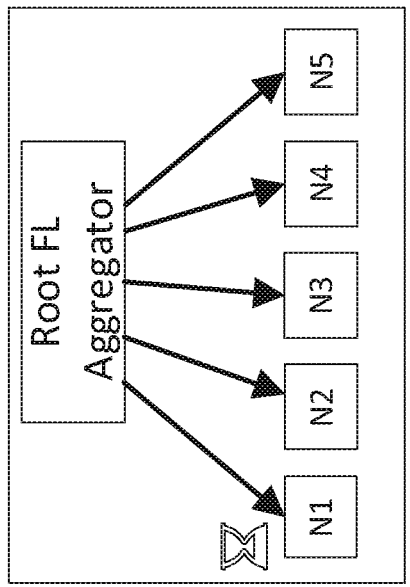
FIG. 5b shows a schematic diagram of an example FL architecture with an unresponsive FLDN.

However, the FLA does not evaluate the behaviour of FLDNs regarding their actual contribution to the overall FL training process. As an example, one or multiple FLDNs in the FL framework may delay reporting their model parameters due to connection issues or applied resource policies on the node (as illustrated in FIG. 5a where N1 is delayed reporting parameters to the root FL aggregator or in FIG. 5b where N1 is unresponsive).

These delays may impose overall latency and reduce the response time of the FL nodes to concept and/or data drift, which jeopardizes the performance of model at inference phase.

Figure 6A:
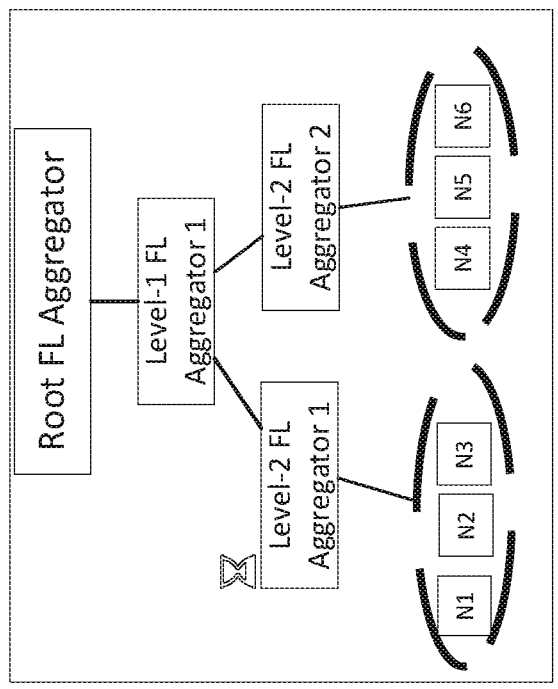
FIG. 6a shows a schematic diagram of an example hierarchical FL architecture with a delayed FLDN.
Figure 6B:
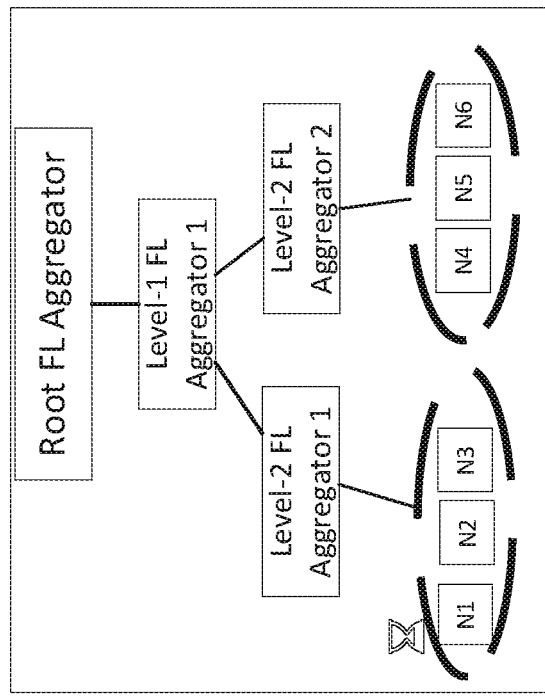
FIG. 6b shows a schematic diagram of an example hierarchical FL architecture with a delayed FLA.

In Hierarchical Federated Learning (HFL), a root FLA or higher level FLAs does not evaluate the behaviour of the underlying FLAs with respect to their actual contribution to the overall FL training process, i.e., if an FLA is contributing towards the convergence of the global model or not based on whether FLA is selecting good participant FLDNs, if an FLA is violating the reporting deadlines for evaluating and reporting the aggregated model parameters or not and how many such violations are occurring over a number of iterations. FIG. 6a illustrates a potential issue where N1 is delayed reporting which may delay Level-2 FL Aggregator 1 and subsequently Level-1 FL Aggregator 1. In FIG. 6b, the mid-level aggregator (Level-2 FL Aggregator 1) is delayed.

In HFL, issues related to FLA may be more dominant, since an FLA contains the contribution and effect of multiple FLDNs and has higher weights. Ignoring the contributions from an FLA node may have a higher level of penalty in form of either contribution to the final aggregated model or the energy consumption efficiency. Hence, an FLA which is frequently joining and leaving the FL training process and how many such instances have occurred over a number of iterations, etc also has to be noted by the root aggregator or higher level aggregator.

Table 1 presents different roles that mobile network entities may take in the FL training process, to which the aforementioned generic challenges in FL apply, along with relevant Standard Development Organisations (SDO's) for the considered case.

TABLE 1

| | FLA | Distributed Node(s) | Relevant SDO |
|---|---|---|---|
| Case 1 | Cross-domain management domain | Individual management domain(s) | SA5 |
| Case 2 | RAN management domain | gNodeB(s) | SA5/RAN3 |
| Case 3 | Core management domain | NWDAF(s) | SA5/SA2 |
| Case 4 | Central NWDAF | Distributed NWDAF(s) | SA2 |
| Case 5 | gNodeB | UE(s) | RAN1/2/3 |
| Case 6 | Non-real-time RIC (rApp) | Real-time RIC(s) (xApp(s)) | ORAN |
| Case 7 | Real-time RIC (xApp) | gNodeB(s) | ORAN |

Table 2 presents different roles that the mobile network entities may take in the HFL training process, to which the aforementioned generic challenges in HFL apply, along with relevant SDO's for the considered case.

TABLE 2

| | Root FLA | Level-1 FLA | Level-2 FLA | Distributed Nodes | Relevant SDO |
|---|---|---|---|---|---|
| Case 1 | Cross-domain management domain | RAN management domain(s) | — | gNodeB(s) | SA5/RAN3 |
| Case 2 | Cross-domain management domain | Core management domain(s) | — | NWDAF(s) | SA5/SA2 |
| Case 3 | Cross-domain management domain | Core management domain(s) | Central NWDAF | Distributed NWDAF(s) | SA5/SA2 |
| Case 4 | gNode-B CU | gNodeB DU(s) | — | UE(s) | RAN1/2/3 |
| Case 5 | Non-real-time RIC (rApp) | Real-time RIC(s) (xApp(s)) | — | gNodeB(s) | ORAN |

Figure 7:
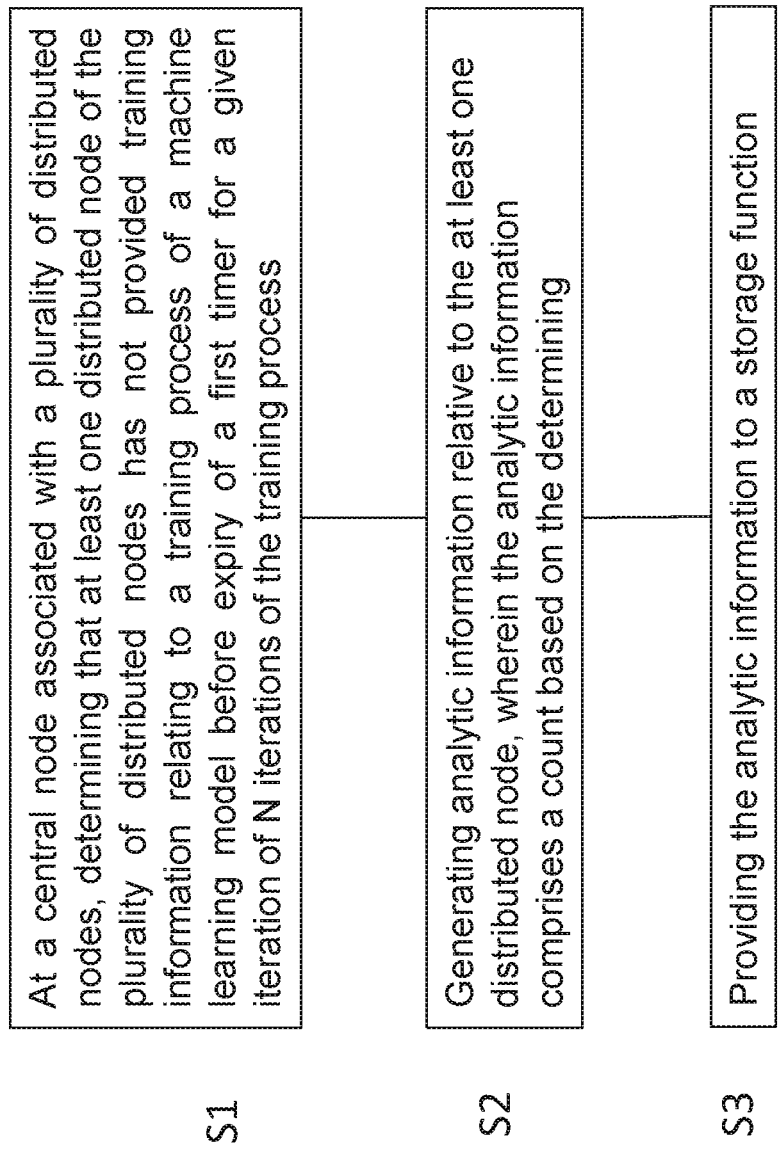
FIG. 7 shows a flowchart of a method according to an example embodiment.

FIG. 7 shows a flowchart of a method according to an example embodiment.

In S1, the method comprises, at a central node associated with a plurality of distributed nodes, determining that at least one distributed node of the plurality of distributed nodes has not provided training information relating to a training process of a machine learning model before expiry of a first timer for a given iteration of N iterations of the training process.

In S2, the method comprises generating analytic information relative to the at least one distributed node, wherein the analytic information comprises a count based on the determining.

In S3, the method comprises providing the analytic information to a storage function.

The method as described with reference to FIG. 7 may be performed at a central node (e.g., at an FLA) associated with a plurality of distributed nodes (e.g., a plurality of FLDN).

Figure 8:
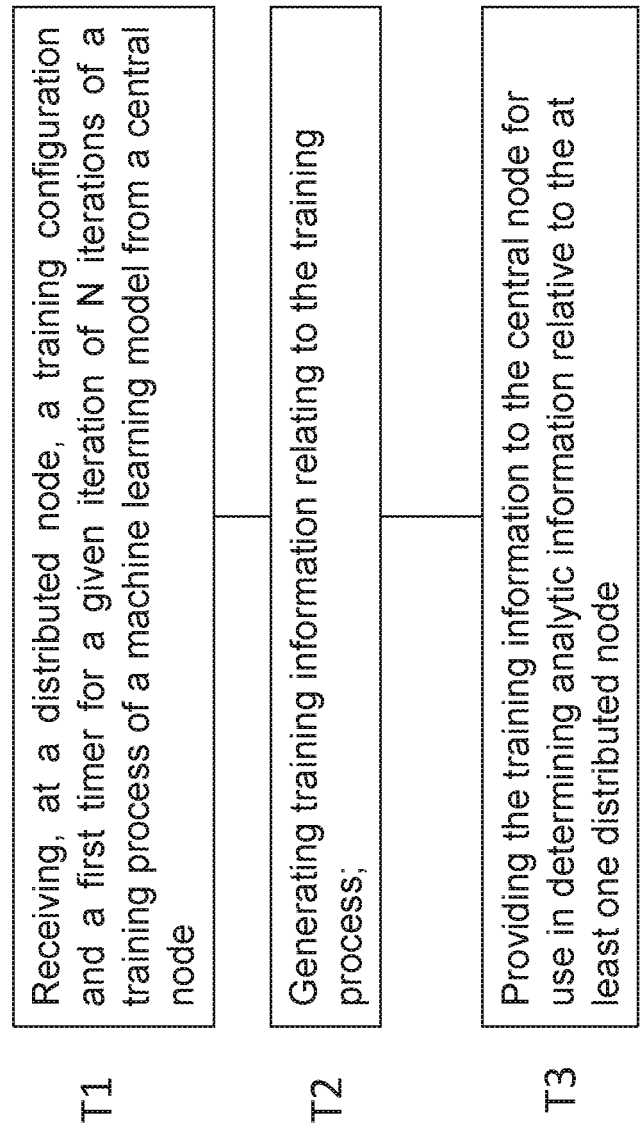
FIG. 8 shows a flowchart of a method according to an example embodiment.

FIG. 8 shows a flowchart of a method according to an example embodiment. The method may be performed at a distributed node.

In T1, the method comprises receiving, at a distributed node, a training configuration and a first timer for a given iteration of N iterations of a training process of a machine learning model from a central node.

In T2, the method comprises generating training information relating to the training process.

In T3, the method comprises providing the training information to the central node for use in determining analytic information relative to the distributed node.

The training information may be generated based on the received training configuration.

A method performed at a storage function may comprise receiving, at a storage function, analytic information from a central node associated with a plurality of distributed nodes, the analytic information associated with a training process of a machine learning model performed at the plurality of distributed nodes and providing the analytic information to a further central node for use in determining a plurality of distributed nodes for a further training process.

The central node of the methods described with reference to FIG. 7 and FIG. 8 may comprise a root FLA and the plurality of distributed nodes may comprise a plurality of FLDNs. Alternatively, or in addition, the plurality of distributed nodes may comprise a plurality of lower-level FLAs (i.e. the central node is a root FLA of a HFL system).

The central node may comprise at least one of the following: RAN OAM entity, CN OAM entity, NWDAF, UE, base station (e.g., gNB), Non-Real Time RAN intelligence controller (RIC), or Near Real Time RIC. The plurality of distributed nodes may comprise at least one of the following: RAN OAM entity, CN OAM entity, NWDAF, UE, base station (e.g., gNB), Non-Real Time RIC or Near Real Time RIC.

The storage function may be an analytics data repository function (ADRF), network repository function (NRF) or operations, assistance and management (OAM) entity In this method, the root node (i.e., the FLA) as the consumer of the training service may set a reporting deadline (e.g. using the first timer) for receiving the result of an iteration of the training process from a FLDN (or lower-level aggregators). The FLDNs (or lower-level aggregators in HFL) are expected to provide the report and trained model prior to deadline. Upon the expiry of the deadline and not receiving the trained version, the root node may check the status of the training, if the training has not stopped and is in progress, the root node may extend the deadline to get the report.

The method as described with reference to FIG. 7 may comprise requesting the at least one distributed node to indicate an expected time to provide training information. The method may comprise receiving an expected time to provide training information from the at least one distributed node in response to the request.

The method described with reference to FIG. 7 may comprise determining whether the expected time is less than a second timer and, if so, means for receiving the information relating to training of the machine learning model before expiry of the second timer and, if not, means for providing an indication to the at least one distributed node to not provide the information for the given iteration. The first timer may be referred to as a reporting deadline and the second timer may be referred to as an extended reporting deadline in the following.

The analytic information may further comprise at least one of the following: average training information response time for the at least one distributed node over N iterations, the average delay for providing the training information for the at least distributed node over N iterations, a relative degree of delay for providing the training information for the at least distributed node over N iterations, the number of iterations performed by the at least one distributed node, the number of times the at least one distributed node left and joined the plurality of distributed nodes during the training process, the number of the plurality of distributed nodes which participated in at least one of the N iterations of the training process, the number of the plurality of distributed nodes which have participated in each N iteration of the training process or the number of distributed nodes which have joined and left the plurality of distributed nodes during the training process.

For example, the FLA may keep track of FL related training analytics related to the participant FLDNs during the FL training process.

The count may indicate the number of times the at least one distributed node did not provide training information relating to a training process of a machine learning model before expiry of a first timer (or the second timer) for a given iteration of N iterations of the training process. In other words, training analytics may comprise the number of times a particular FLDN has violated the reporting deadline for reporting their local model parameters as defined by the FLA. In turn, there may also be dedicated counters to keep track of the number of violations for the whole FL training process or for the last 'N' iterations of the FL training process, the degree (e.g., high (report received after X time units), medium (report received after X−t time units), low (report received after X−2t time units)) of violation with respect to the reporting deadline (i.e., the relative degree of delay for providing the training information for the at least distributed node over N iterations) and the number of violations of the extended reporting deadlines.

For N iterations, the FLA collects FL training analytics about each FLDN which may include, the number of iterations a particular FLDN has participated in during the whole FL training process. In turn, there may also be dedicated counters to keep track of the number of FLDNs that have participated in at least a single iteration of the whole FL training process, the number of FLDNs that have participated for the whole FL training process and the number of times a particular FLDN has left and rejoined the training during the whole FL training process. In turn, there may also be dedicated counters to keep track of the number of FLDNs that have left and rejoined the training during the whole FL training process and the number of candidate FLDNs that could not be selected by the FLA to participate in the training during the whole FL training process. The FL training analytics is an example of analytics information relative to the at least one distributed node The method described with reference to FIG. 7 may comprise determining a confidence value (also referred to as a confidence score) for the at least one distributed node based on the analytic information and providing the confidence value to the storage function. The method at the storage function may comprise receiving a confidence value associated with at least one of the plurality of distributed nodes from the central node, wherein the confidence value is determined based on the analytic information.

In an example embodiment, based on the collected information, the FLA may assign a "confidence score" for each FLDN based on their actual contribution to the overall FL training process.

The collected information or the confidence score of each FLDN may be stored in a common repository (also referred to as a storage function) so that other FLAs belonging to different use cases may make use of this information during the selection of participant FLDNs in their FL training process. Additionally, the collected information or the confidence score of each FLDN may be reported to the OAM.

It is to be noted that similar information and confidence score may also be collected for intermediate FLA's in the context of HFL training process.

The confidence score may be used for forming future FL network including selection of the FLDNs and/or deciding on the roles of each of the FLDNs (in HFL). In addition, the confidence score may enable the network to revise the FL network by adding/removing FLDN(s) or providing more innovative solution to increase the resilience and robustness of the network.

Hence, the evaluations may consider if an FLDN is contributing towards the convergence of the global model or not, or if an FLDN is violating the reporting deadlines for reporting their local model parameters or not and how many such violations are occurring over a number of iterations, if an FLDN is frequently joining and leaving the FL training process and how many such instances have occurred over a number of iterations, etc.

Figure 9:
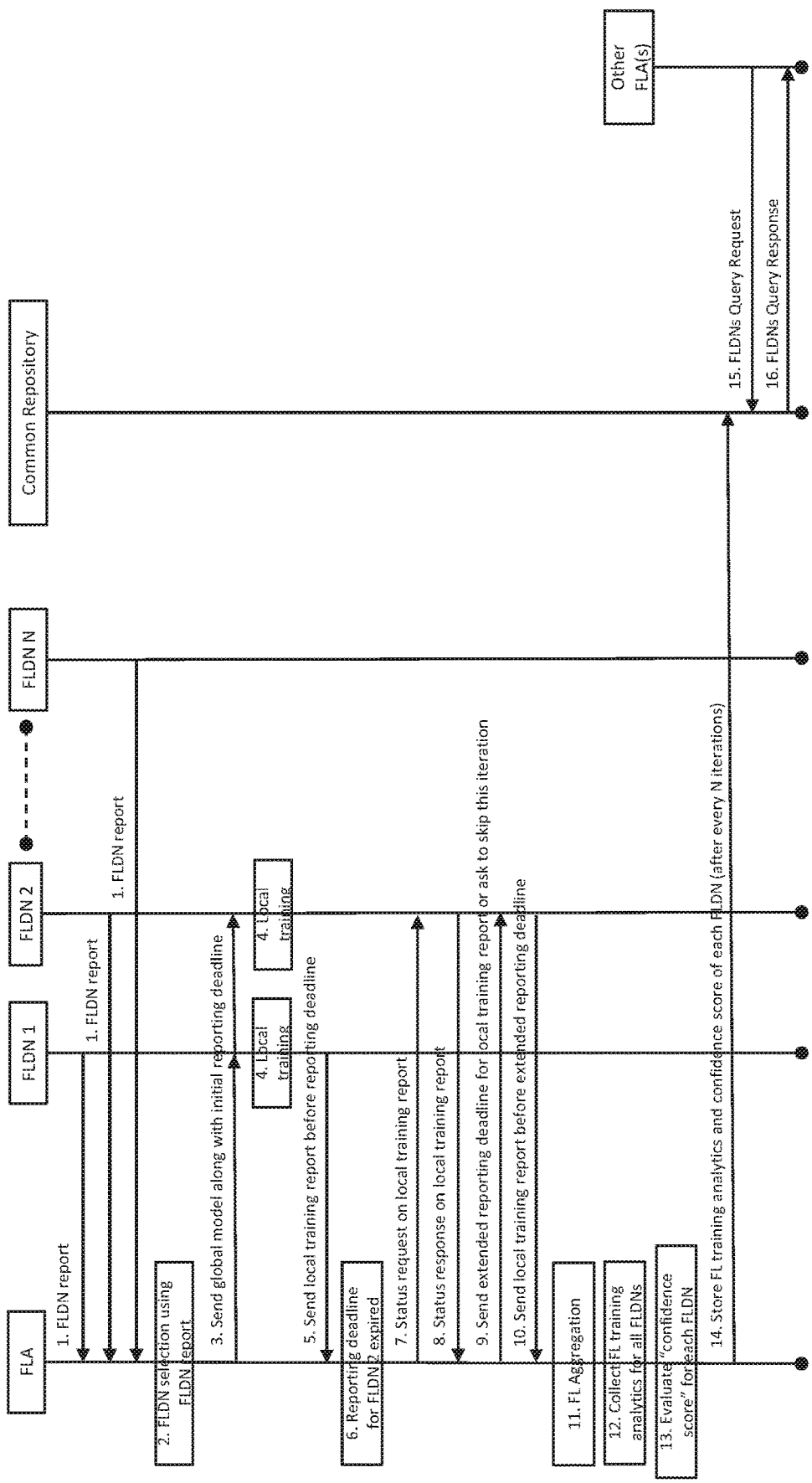
FIG. 9 shows a signalling flow between a FL architecture, a common repository and other FL aggregators.

FIG. 9 illustrates a message sequence of an example scheme to support the collection of FL training analytics.

In step 1, candidate FLDNs (FLDN 1, FLDN 2 and FLDN 3) report on at least one of their computational resource availability, power availability, link quality, or quality/trustworthiness of local training data, etc. to the FLA.

In step 2, the FLA uses FLDN reports received from candidate FLDNs to select participant FLDNs (FLDN 1 and FLDN 2) for training.

In step 3, the FLA sends the global model and the training configuration to the participant FLDNs (FLDN 1 and FLDN 2) along with an initial reporting deadline before which the FLDNs have to report the local model parameters after the local training.

In step 4, participant FLDNs (FLDN 1 and FLDN 2) perform local training as per the training configuration received in step 3.

In step 5, FLDN 1 sends a local training report before the reporting deadline while FLDN 2 does not. The local training report is an example of training information relating to a training process of a machine learning model.

In steps 6 and 7, the FLA waits for the reporting deadline of FLDN 2 to expire before sending a Status Request message about local training report to FLDN 2. The Status Request message may include attributes such as expected time units for local training to complete, expected degree (low, medium, high) of delay in reporting the local model parameters, etc. The status request message is an example of a message for requesting the distributed node to indicate an expected time to provide training information.

In step 8, FLDN 2 sends the status response to FLA indicating the time units needed to complete the local training and send the local training report or the expected degree of delay in reporting the local model parameters (i.e., the expected time to provide training information).

In step 9, if the status response in step 8 indicates that the additional time needed for FLDN 2 to send the local training report is acceptable, the FLA sends an extended reporting deadline to FLDN 2 before which it has to send the local training report. Otherwise, the FLA can indicate FLDN 2 to skip reporting for this iteration.

In step 10, the FLDN 2 sends a local training report before the extended reporting deadline.

In step 11, the FLA aggregates the local model parameters received from various participant FLDNs (FLDN 1 and FLDN 2).

Steps 1 to 11 repeat in a loop until the global model converges.

At step 12, for each iteration of steps 1 to 11, the FLA collects FL training analytics about each FLDN. The training analytics may be as described above.

In step 13, after N iterations, the FLA assigns a confidence score for each FLDN. Confidence score may be based on the counters that are collected in step 12 and may be implementation specific.

In step 14, after N iterations, the FLA stores the collected FL training analytics and confidence score of each FLDN in a common repository (e.g., ADRF in SA2) that can be accessed by other FLAs.

In HFL, the collected FL training analytics and confidence score of each FLDN and each FLA (non-root) may be stored in a common repository that can be accessed by other FLAs.

In step 15, other FLA(s) use the information stored in step 14 to decide if an FLDN is to be selected for training for its own use case, i.e., other FLA(s) may send a FLDNs Query Request to the common repository including the IDs of all its candidate FLDNs before initiating the FLDN selection process for training.

In step 16, the common repository provides the stored historical information (i.e., FL training analytics) about the indicated FLDNs (if it has any such information about the FLDNs) to other FLA(s) in response to a FLDNs Query Response message.

In an example embodiment, FL is performed among NWDAFs in a 5GC network. 3GPP standards contain definitions for Federated Learning among NWDAF. In such context the FLA is regarded as "NWDAF containing MTLF as Server NWDAF" or "Server NWDAF" in short, and an FLDN is "NWDAF containing MTLF as Client NWDAF" or "Client NWDAF". The common repository is regarded as ADRF. The FL training analytics is regarded as FL training report. The local training report is regarded as the combination of the Interim local ML model information and local model metric.

The procedure described with reference to FIG. 9 may be implemented in a 5G Core Network as follows.

The NWDAF containing MTLF registers to NRF with its NF profile, which includes NWDAF NF Type, Analytics ID(s), Address information of NWDAF, Service Area, FL capability information and Time interval supporting FL. The FL capability information includes the FL capability Type (i.e. FL server for Server NWDAF or FL client for Client NWDAF) and might contain information about computational resource availability and/or power availability and/or link quality and/or quality/trustworthiness of local training data. This step of the procedure is not illustrated in FIG. 9.

The Server NWDAF discovers and selects other NWDAF(s) containing MTLF as Client NWDAF(s) from NRF by invoking the Nnrf_NFDiscovery_Request service operation. The following criteria might be used: Analytic ID of the ML model required, FL capability Information, Service Area, Data availability by the Client NWDAF, Time Period of Interest, Interoperability Indicator. This step of the procedure is not illustrated in FIG. 9.

Server NWDAF may retrieve from ADRF the FL reports associated to the Analytics ID and related to the list of candidate Client NWDAF received from NRF. The Server NWDAF uses the FL reports to assist the Client NWDAF selection process. The FL training report is an example of analytics information relative to the at least one distributed node. This step of the procedure is not illustrated in FIG. 9.

In step 1 of FIG. 9, the FLDNs send their status directly to the FLA. However, in an alternative implementation the status may be relayed by an intermediate function, such as for example via the NRF. During the Federated Learning execution phase, the Server NWDAF may get the updated status of current Client NWDAF(s) via NRF by using Nnrf_NFManagement service (as in 3GPP standards) or via notifications of status changes of the current NWDAF(s). The status of a current Client NWDAF could be availability changes, capability changes (e.g., it will not support FL anymore, etc.).

As shown in step 2 of FIG. 9, the server NWDAF performs the selection of Client NWDAF(s) to be part of the FL training, using the FL reports and the status information of Client NWDAF(s) to assist the selection.

The Server NWDAF sends Federated Learning preparation request to the Client NWDAF(s) with Interoperability information. In the preparation request, the following parameters may be added: Available data requirement, availability time requirement. This procedure is not illustrated in any step of FIG. 9.

The client NWDAF(s) decides whether to join the Federated Learning process based on its availability, computation and communication capability, and Interoperability information and eventually sends the response to Server NWDAF indicating if it will join the FL procedure. This procedure is not illustrated in any step of FIG. 9.

As shown in step 3 of FIG. 9, the server NWDAF sends a request to the selected NWDAF containing MTLF(Client NWDAF) that participates in the Federated learning to perform the local model training for Federated Learning, including model metric. FL Server includes initial ML Model Information, a Federated Learning execution flag, FL Correlation ID, guideline information (e.g., maximum response time for FL Client to provide interim local ML model information) in the preparation message.

As shown in steps 4 and 5 in FIG. 9, during the Federated Learning training procedure, each Client NWDAF further trains the retrieved ML model from the Server NWDAF based on its own data, and reports interim local ML model information to the Server NWDAF. Each Client NWDAF also computes local model metric and reports it to the Server NWDAF. Some Client NWDAF, referred to below as Client NWDAF*, may fail to report by the reporting deadline, i.e., maximum response time. Interim local ML model information and local model metric are examples of training information relating to a training process of a machine learning model.

As in steps 6 and 7 in FIG. 9, the server NWDAF waits for the reporting deadline to expire before sending the FL Status Request about to Client NWDAF* about reporting the Interim local ML model information and local model metric. The FL Status Request message may include attributes such as expected time units for local training to complete, expected degree (low, medium, high) of delay in reporting, etc. The FL Status Request is an example of a possible way for requesting the at least one distributed node to indicate an expected time to provide training information.

As in step 8 in FIG. 9, the Client NWDAF* sends an FL Status Response to Server NWDAF indicating the time units needed to complete the local training and sending the Interim local ML model information and local model metric. The FL Status Response is an example of a possible way for receiving an expected time to provide training information from the at least one distributed node in response to the request.

Corresponding to step 9 in FIG. 9, if the FL Status Response indicates that the additional time needed for Client NWDAF* to send Interim local ML model information and local model metric is acceptable, the Server NWDAF can send an extended reporting deadline to Client NWDAF* before which it has to send the Interim local ML model information and local model metric. Otherwise, the Server NWDAF indicates Client NWDAF* to skip reporting for this iteration.

Corresponding to step 10 in FIG. 9, the client NWDAF* sends the interim local ML model information and a local training report before the extended reporting deadline.

Corresponding to step 11 in FIG. 9, the server NWDAF aggregates the local model parameters received from various participant Client NWDAFs.

For each iteration, the Server NWDAF collects FL training analytics about each Client NWDAF, as described above.

For N iterations, the Server NWDAF collects FL training analytics about each Client NWDAF, as described above.

After N iterations, the Server NWDAF assigns a confidence score for each Client NWDAF. The confidence score can be based on the counters of the analytic information as described above and may be implementation specific.

After N iterations, the Server NWDAF stores the collected FL training report and confidence score of each FLDN in a common repository (e.g., NRF in this example embodiment) that can be accessed by other Server NWDAFs. The FL training report is an example of analytics information relative to the at least one distributed node.

A Server NWDAF checks Client NWDAF(s) status based on the information and judges whether reselection of Client NWDAF(s) for the next round(s) of Federated Learning is needed. The judgement is based on the updated status of the Client NWDAF(s), including the availability, capability, status of FL training, and the confidence score computed.

If re-selection is needed, the server NWDAF discovers new candidate Client NWDAF(s) via NRF. Server NWDAF reselects Client NWDAF(s) from the current Client NWDAF(s) and the new candidate Client NWDAF(s).

Server NWDAF sends termination request to the Client NWDAF(s) which will be removed from the Federated Learning process optionally indicating the reason. Client NWDAF(s) terminates Federated Learning operations When discovering client NWDAF, other Server WDAF(s) may use the information stored in the NRF to decide if a Client NWDAF is to be selected for training for its own use case, as indicated.

In the example embodiment described above, the FL training report and confidence score is stored at the NRF, being the registry used to discover Client NWDAF. In another embodiment, the FL training report and confidence score may be stored in ADRF, or a dedicated NF. In such case, after the Server NWDAF discovers a list of candidates Client NWDAF via NRF, it may query the storage functionality to get FL reports and possibly FL scores about such candidates. To comply with the service-based architecture of 5GC, the storage functionality offers a service to store, query and fetch the FL reports and the FL scores.

An apparatus may comprise means for at a central node associated with a plurality of distributed nodes, determining that at least one distributed node of the plurality of distributed nodes has not provided training information relating to a training process of a machine learning model before expiry of a first timer for a given iteration of N iterations of the training process; means for generating analytic information relative to the at least one distributed node, wherein the analytic information comprises a count based on the determining; and means for providing the analytic information to a storage function.

Alternatively, an apparatus may comprise means for means for receiving, at a distributed node, a training configuration and a first timer for a given iteration of N iterations of a training process of a machine learning model from a central node, means for generating training information relating to the training process and means for providing the training information to the central node for use in determining analytic information relative to the distributed node.

The apparatus may comprise a network node or network function, be the network node or network function or be comprised in the network node or network function or a chipset for performing at least some actions of/for the network node or network function.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst some embodiments have been described in relation to 5G networks, similar principles can be applied in relation to other networks and communication systems. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

In general, the various embodiments may be implemented in hardware or special purpose circuitry, software, logic or any combination thereof. Some aspects of the disclosure may be implemented in hardware, while other aspects may be implemented in firmware or software which may be executed by a controller, microprocessor or other computing device, although the disclosure is not limited thereto. While various aspects of the disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The embodiments of this disclosure may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media. The term "non-transitory," as used herein, is a limitation of the medium itself (i.e., tangible, not a signal) as opposed to a limitation on data storage persistency (e.g., RAM vs. ROM).

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the disclosure may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The scope of protection sought for various embodiments of the disclosure is set out by the independent claims. The embodiments and features, if any, described in this specification that do not fall under the scope of the independent claims are to be interpreted as examples useful for understanding various embodiments of the disclosure.

The foregoing description has provided by way of non-limiting examples a full and informative description of the exemplary embodiment of this disclosure. However, various modifications and adaptations may become apparent to those skilled in the relevant arts in view of the foregoing description, when read in conjunction with the accompanying drawings and the appended claims. However, all such and similar modifications of the teachings of this disclosure will still fall within the scope of this invention as defined in the appended claims. Indeed, there is a further embodiment comprising a combination of one or more embodiments with any of the other embodiments previously discussed.

The invention claimed is:

1. An apparatus for a communication network, the apparatus comprising:
   at least one processor; and
   at least one memory storing instructions, which when executed by the at least one processor, cause the apparatus at least to perform:
   determining that at least one distributed node of a plurality of distributed nodes associated with the apparatus has not provided training information relating to a training process of a machine learning model before expiry of a first timer for a given iteration of N iterations of the training process;
   generating analytic information relative to the at least one distributed node, wherein the analytic information comprises a count based on the determining; and
   providing the analytic information to a storage function.

2. The apparatus according to claim 1, wherein the instructions, when executed by the at least one processor, further cause the apparatus at least to perform:
   requesting the at least one distributed node to indicate an expected time to provide the training information.

3. The apparatus according to claim 2, wherein the instructions, when executed by the at least one processor, further cause the apparatus at least to perform:
   receiving, from the at least one distributed node, in response to the requesting, the expected time to provide the training information.

4. The apparatus according to claim 3, wherein the instructions, when executed by the at least one processor, further cause the apparatus at least to perform:
   determining whether the expected time is less than a time associated with a second timer; and
   if the expected time is less than the time associated with the second timer, receiving the training information before expiry of the second timer, or
   if the expected time is not less than the time associated with the second timer, providing an indication to the at least one distributed node to not provide the training information for the given iteration.

5. The apparatus according to claim 1, wherein the instructions, when executed by the at least one processor, further cause the apparatus at least to perform:
   determining a confidence value for the at least one distributed node based on the analytic information; and
   providing the confidence value to the storage function.

6. The apparatus according to claim 1, wherein the apparatus comprises a root federated learning aggregator, and wherein the plurality of distributed nodes comprises a plurality of federated learning distributed nodes.

7. The apparatus according to claim 1, wherein the apparatus comprises a root federated learning aggregator, and wherein the plurality of distributed nodes comprises a plurality of lower-level federated learning aggregators.

8. The apparatus according to claim 1, wherein the analytic information further comprises at least one of the following:
   average training information response time for the at least one distributed node over the N iterations,
   average delay for providing the training information for the at least distributed node over the N iterations,
   a relative degree of delay for providing the training information for the at least distributed node over the N iterations,
   a number of iterations performed by the at least one distributed node during the training process,
   a number of times the at least one distributed node left and joined the plurality of distributed nodes during the training process,
   a number of distributed nodes of the plurality of distributed nodes which participated in at least one of the N iterations of the training process,
   a number of distributed nodes of the plurality of distributed nodes which have participated in each iteration of the N iterations of the training process, or
   a number of distributed nodes which have joined and left the plurality of distributed nodes during the training process.

9. The apparatus according to claim 1, wherein the storage function comprises:
   an analytics data repository function,
   a network repository function, or
   an operations, administration and management entity.

10. The apparatus according to claim 1,
    wherein the apparatus comprises at least one of the following:
    a radio access network (RAN) operations, administration and management entity,
    a core network (CN) operations, administration and management entity,
    a network function for performing data analytics,
    a user equipment, a base station,
a non-real time RAN intelligence controller (RIC), or
a near real time RIC,
and wherein the plurality of distributed nodes comprises at least one of the following:
another RAN operations, administration and management entity,
another CN operations, administration and management entity,
another network function for performing data analytics,
another user equipment,
another base station,
another non-real time RIC, or
another near real time RIC.

11. An apparatus comprising:
at least one processor; and
at least one memory storing instructions, which when executed by the at least one processor, cause the apparatus at least to perform:
receiving, from a central node, a training configuration and a first timer for a given iteration of N iterations of a training process of a machine learning model;
generating training information relating to the training process; and
providing the training information to the central node for use in determining analytic information relative to the apparatus.

12. The apparatus according to claim 11, wherein the instructions, when executed by the at least one processor, further cause the apparatus at least to perform:
receiving, from the central node, when the training information is not provided to the central node before expiration of the first timer, a request to indicate an expected time to provide the training information; and
providing, in response to the request, to the central node, the expected time to provide the training information.

13. The apparatus according to claim 12, wherein the instructions, when executed by the at least one processor, further cause the apparatus at least to perform:
receiving a second timer or an indication to not provide the information for the given iteration.

14. The apparatus according to claim 11, wherein the apparatus comprises at least one of the following:
a radio access network (RAN) operations, administration and management entity,
a core network (CN) operations, administration and management entity,
a network function for performing data analytics,
a user equipment,
a base station,
a non-real time RAN intelligence controller (RIC), or
a near real time RIC.

15. The apparatus according to claim 11, wherein the central node comprises at least one of the following:

another RAN operations, administration and management entity,
another CN operations, administration and management entity,
another network function for performing data analytics,
another user equipment,
another base station,
another non-real time RIC, or
another near real time RIC.

16. A computer readable medium comprising instructions which, when executed by an apparatus for a network node, cause the apparatus to perform at least the following:
determining that at least one distributed node of a plurality of distributed nodes associated with the apparatus has not provided training information relating to a training process of a machine learning model before expiry of a first timer for a given iteration of N iterations of the training process;
generating analytic information relative to the at least one distributed node, wherein the analytic information comprises a count based on the determining; and
providing the analytic information to a storage function.

17. A method comprising:
determining that at least one distributed node of a plurality of distributed nodes associated with the apparatus has not provided training information relating to a training process of a machine learning model before expiry of a first timer for a given iteration of N iterations of the training process;
generating analytic information relative to the at least one distributed node, wherein the analytic information comprises a count based on the determining; and
providing the analytic information to a storage function.

18. The method according to claim 17, further comprising:
requesting the at least one distributed node to indicate an expected time to provide the training information.

19. The method according to claim 18, further comprising:
receiving, from the at least one distributed node, in response to the requesting, the expected time to provide the training information.

20. The method according to claim 19, further comprising:
determining whether the expected time is less than a time associated with a second timer; and
if the expected time is less than the time associated with the second timer, receiving the training information before expiry of the second timer, or
if the expected time is not less than the time associated with the second timer, providing an indication to the at least one distributed node to not provide the training information for the given iteration.

* * * * *